UNITED STATES PATENT OFFICE.

PRUDENCIO CASTELLANOS, OF SAN FRANCISCO, CALIFORNIA.

IMPROVEMENT IN RECOVERING ACIDS FROM RESIDUUM OF NITRO-GLYCERINE MANUFACTURE.

Specification forming part of Letters Patent No. 164,261, dated June 8, 1875; application filed October 27, 1874.

CASE 2.

*To all whom it may concern:*

Be it known that I, PRUDENCIO CASTELLANOS, of San Francisco city and county, State of California, have invented a Process for Treating and Removing Acids from the Compound Remaining after the Manufacture of Nitro-Glycerine; and I do hereby declare the following description sufficient to enable any person skilled in the art or science to which it most nearly appertains to make and use my said invention without further invention or experiment.

My invention relates to a process by which I am enabled to utilize the compound remaining after the process of manufacturing nitroglycerine is completed, by so treating it that I separate from the sulphuric acid all free nitric acid and other deleterious substances, and render the former useful for manufacturing purposes, while I also utilize the other gaseous products.

Nitro-glycerine is prepared as follows: A compound is first made of one part of nitric acid at 48° or 50° and two parts of sulphuric acid at 66°. With this acid mixture the glycerine is treated at 30° in an apparatus which allows the materials to revolve or mix continuously by means of a simple mechanism, and at the same time admits of the introduction of water. After the operation is complete the compound is diluted with much water, which assists the separation of the nitroglycerine produced, because, being insoluble and heavier than dilute acid, it will precipitate to the bottom of the vessel.

The liquid which floats on the surface, and which contains all of the sulphuric acid used in the operation, (because this acid does not combine with the glycerine,) a little free nitric acid, and a certain quantity of nitro-glycerine dissolved in the liquid by the action of the excess of acid, within which it was formed, is poured off and rejected as useless, since no one has, up to the present time, been able to utilize it, and also from its dangerous nature, owing to the nitro-glycerine remaining in solution, which is liable at any time to be decomposed and cause serious accidents. Added to this, the highly oxidized condition of the nitric acid and nitro-glycerine, and their easy decomposition, cause them to attack all the ordinary vessels within which manufactures pertaining to sulphuric acid are carried on.

It is necessary, therefore, to separate and utilize the pure nitric acid to decompose the nitro-glycerine, separating as well the nitric acid which this substance contains, and to evaporate a great quantity of water in which the acids are diluted, this also being used. By this means the sulphuric acid may be isolated, and although it will still be mixed with some glycerine and other organic substances, it may be used in many of the ordinary industries.

My process consists in the concentration of these liquids by applying to them a heat which should exceed two hundred and twenty (220°) degrees, and at the same time causing the action of the sulphurous acids to intervene, this operation being carried on in an apparatus which will not allow of the accumulation of large quantities of the liquids, so as to be dangerous, but which will provide for the action of sulphurous acid at a temperature of 220°, and which may have certain leaden chambers connected with it, so that the separated gaseous product may be utilized to form sulphuric acid separately from that which is to be concentrated and purified.

In order to effect these changes the compound acids before described as remaining are allowed to pass in small quantities from a suitable containing-vessel into a chamber, where they are minutely divided and subjected to the combined influence of heat, (which will evaporate the water, decompose the nitric acid and nitro-glycerine,) and to the action of sulphurous-acid vapor at about the temperature above stated.

The sulphuric acid deprived of these substances will pass to a proper outlet, and can be drawn off. The steam and gaseous vapors resulting from the decomposition, together with the sulphurous acid gas, will be conducted to the leaden chambers, and there undergo the reactions usual in forming sulphuric acid.

The particular form of apparatus which I employ is made the subject of another application for a patent in this connection.

Is is well known that sulphurous acid will decompose nitric acid in its concentrated state, taking to itself a portion of the oxygen; but when the nitric acid is diluted with much water, as in the present case, the application of heat will be necessary to produce this result.

The effect of my process, then, is, first, to effect a complete separation of the pure and combined nitric acid contained in the compound liquid in the form of hyponitric acid, and the useful employment of this gas in the reaction of the leaden chambers; and, secondly, to isolate sulphuric acid, so that it can be made useful for the manufacture of many of the sulphates.

Having thus described my invention, what I claim, and desire to secure by Letters Patent, is—

The process herein described for treating and recovering acids from the residuum remaining after the manufacture of nitro-glycerine, consisting in dropping the dilute residuum in small quantities through a heated chamber filled with obstruction, passing sulphurous-acid gas into the same, and collecting the resulting nitric acid in leaden chambers, while the sulphuric acid is drawn off from the bottom of the heated chamber.

In witness whereof I hereunto set my hand and seal.

PRUDENCIO CASTELLANOS. [L. S.]

Witnesses:
GEO. H. STRONG,
C. M. RICHARDSON.